US012806976B2

(12) United States Patent
Yamada et al.

(10) Patent No.: US 12,806,976 B2
(45) Date of Patent: Nov. 24, 2026

(54) SIDE STRUCTURE OF VEHICLE

(71) Applicant: Honda Motor Co., Ltd., Tokyo (JP)

(72) Inventors: Hitomi Yamada, Saitama (JP); Takayuki Soma, Tokyo (JP); Eiji Hirano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 18/635,043

(22) Filed: Apr. 15, 2024

(65) Prior Publication Data

US 2024/0399841 A1 Dec. 5, 2024

(30) Foreign Application Priority Data

May 30, 2023 (CN) ......................... 202310623742.9

(51) Int. Cl.

*B60J 5/02* (2006.01)
*B60J 5/04* (2006.01)
*B62D 21/15* (2006.01)
*B62D 25/04* (2006.01)
*B62D 25/16* (2006.01)
*E05D 3/02* (2006.01)

(52) U.S. Cl.

CPC .......... *B60J 5/0425* (2013.01); *B62D 21/157* (2013.01); *B62D 25/04* (2013.01); *B62D 25/16* (2013.01); *E05D 3/02* (2013.01); *E05Y 2900/531* (2013.01)

(58) Field of Classification Search

CPC ...... B62D 21/157; B62D 25/04; B62D 25/16; B60J 5/0425
USPC ....................................... 296/193.06, 187.12
See application file for complete search history.

(56) References Cited

U.S. PATENT DOCUMENTS 4,013,317 A * 3/1977 Reidelbach ............ B60J 5/0425 296/187.12
5,518,290 A * 5/1996 Reinhard ............... B60J 5/0458 296/187.12
5,599,057 A * 2/1997 Hirahara ................ B62D 21/15 296/187.12
6,217,109 B1 * 4/2001 Okana .................. B62D 25/025 296/203.03
9,796,425 B2 * 10/2017 Tanaka ................... B60J 5/0429
10,549,785 B2 * 2/2020 Lee ........................ B62D 25/04
11,618,304 B2 * 4/2023 Tokuno .................. B60J 5/0429 296/146.6

(Continued)

FOREIGN PATENT DOCUMENTS

JP 2019111926 7/2019

*Primary Examiner* — Joseph D. Pape
(74) *Attorney, Agent, or Firm* — JCIPRNET

(57) ABSTRACT

A side structure of a vehicle is capable of withstanding impacts from the front-rear direction and the side direction with a relatively simple structure. The side structure of the vehicle includes: a pillar which extends along a vehicle up-down direction and is formed into a hollow structure; a door panel which is disposed at a door opening of the vehicle; and a door beam which is disposed in the door panel and extends along a vehicle front-rear direction, and is formed into a hollow structure. The pillar overlaps the door beam when viewed from a vehicle width direction. The pillar includes a first bulkhead which is disposed inside the pillar and corresponds to a position where the pillar overlaps the door beam when viewed from the vehicle width direction. The first bulkhead separates a space inside the pillar in the vehicle up-down direction.

10 Claims, 6 Drawing Sheets

(56) References Cited

U.S. PATENT DOCUMENTS

2010/0225141 A1* 9/2010 Mori ...................... B60J 5/0437
296/146.6

* cited by examiner

SIDE STRUCTURE OF VEHICLE

CROSS-REFERENCE TO RELATED APPLICATION

This application claims the priority benefit of China application serial no. 202310623742.9, filed on May 30, 2023. The entirety of the above-mentioned patent application is hereby incorporated by reference herein and made a part of this specification.

BACKGROUND

Technical Field

The disclosure relates to a side structure of a vehicle.

Description of Related Art

In order to allow the elderly, the disabled, children and other disadvantaged groups to use a sustainable transport system, efforts have been made to provide a transportation vehicle with better vehicle body rigidity. In the existing technology, the design between the pillar and the door beam has no direct or indirect connection relationship. Therefore, the reinforcement measures to withstand the impact are mostly to increase the thickness, material strength, or even increase the number of components to suppress the deformation of the interior of the vehicle. In this way, in addition to increasing the weight of the vehicle body, relatively numerous components also increase the complexity of assembly. The disclosure is intended to improve the vehicle rigidity and reduce weight, and is further expected to provide a sustainable transport system.

SUMMARY

The disclosure provides a side structure of a vehicle capable of withstanding impacts from the front-rear direction and the side direction with a relatively simple structure.

The side structure of the vehicle of the disclosure includes: a pillar which extends along a vehicle up-down direction and is formed into a hollow structure; a door panel which is disposed at a door opening of the vehicle; and a door beam which is disposed in the door panel, extends along a vehicle front-rear direction and is formed into a hollow structure. The pillar overlaps the door beam when viewed from a vehicle width direction. The pillar includes a first bulkhead which is disposed inside the pillar and corresponds to a position where the pillar overlaps the door beam when viewed from the vehicle width direction. The first bulkhead separates a space inside the pillar in the vehicle up-down direction.

In order to make the above-mentioned features and advantages of the disclosure comprehensible, embodiments accompanied with drawings are described in detail as follows.

DESCRIPTION OF THE EMBODIMENTS

Figure 1:
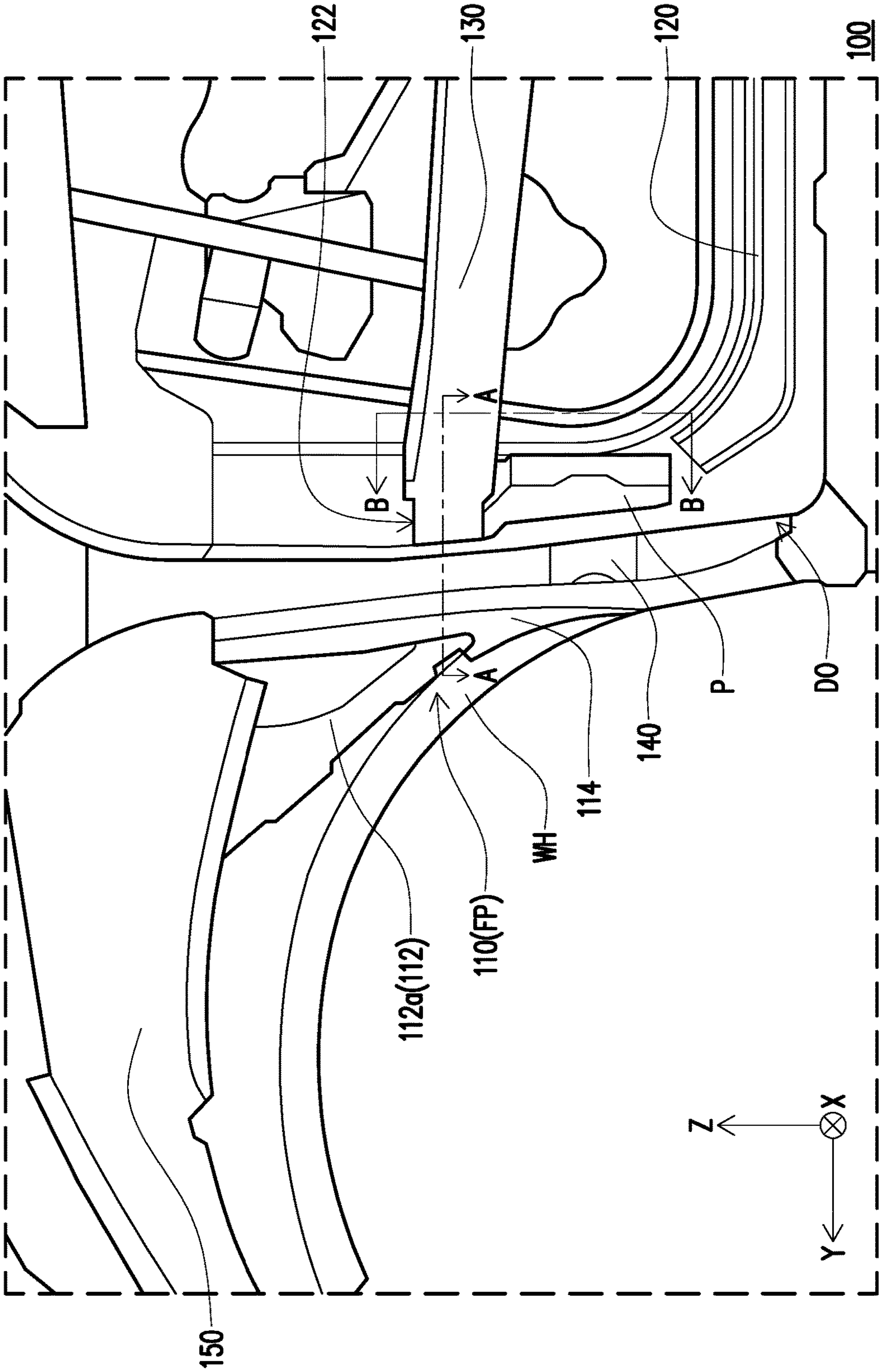
FIG. 1 is a partial side view of a side structure of a vehicle according to an embodiment of the disclosure.

In an embodiment of the disclosure, a door hinge is formed on an outer side surface of the pillar in the vehicle width direction, and the door hinge is connected to the door panel. The door hinge and an end portion of the door beam are disposed to be staggered in the vehicle up-down direction.

In an embodiment of the disclosure, a patch joined to the door panel is formed on a front side of the door opening in the vehicle front-rear direction, and the patch is respectively joined to the door beam and the door hinge.

In an embodiment of the disclosure, the door hinge includes a rotating portion, and the door hinge partially overlaps the door beam when viewed from the vehicle up-down direction. The door beam is joined to the door panel at a position further rearward than the rotating portion in the vehicle front-rear direction.

In an embodiment of the disclosure, the pillar further includes a second bulkhead which is formed in a box shape and is connected to the door hinge. The first bulkhead and the second bulkhead each have a flange portion extending in the vehicle up-down direction, and a lower flange of the first bulkhead is joined to an upper flange of the second bulkhead in an overlapping manner.

In an embodiment of the disclosure, the first bulkhead and the second bulkhead are each formed with a first bead extending along the vehicle width direction on a front-rear side surface in the vehicle front-rear direction. The first bead of the first bulkhead is formed at a position corresponding to the door beam, and the first bead of the second bulkhead is formed at a position corresponding to the door hinge.

In an embodiment of the disclosure, a second bead extending along the vehicle front-rear direction is formed on an outer side surface of the first bulkhead in the vehicle width direction.

In an embodiment of the disclosure, the door panel includes a concave portion which is recessed along a longitudinal direction of the door beam, and the concave portion is joined to an end portion of the door beam.

In an embodiment of the disclosure, the pillar includes a pillar inner member and a pillar outer member. The pillar is formed with an upper side frame extending along the vehicle front-rear direction on a front side of the vehicle front-rear direction. The pillar inner member includes an inclined portion extending obliquely toward the upper side frame and being joined to the upper side frame. The inclined portion is formed at a position corresponding to the door beam in the vehicle front-rear direction.

In an embodiment of the disclosure, the pillar is a front pillar of the vehicle, and the front pillar is formed as a part of a wheelhouse.

In an embodiment of the disclosure, a door hinge is formed on an outer side surface of the pillar in the vehicle width direction, and the door hinge is connected to the door panel. Moreover, the door hinge overlaps the first bulkhead when viewed from the vehicle width direction. The door hinge and an end portion of the door beam are disposed correspondingly in the vehicle front-rear direction.

Based on the above, in the side structure of the vehicle of the disclosure, the door beam overlaps the pillar in the vehicle width direction, so that in the event of a side impact, the load can be transmitted from the door beam to the pillar with higher rigidity. In addition, the first bulkhead is provided inside the pillar and corresponds to a position where the pillar overlaps the door beam, which can further suppress the cross section from being crushed when the pillar is stressed. Accordingly, the side structure of the vehicle of the disclosure can withstand impacts from the front-rear direction and the side direction with a relatively simple structure.

Figure 2A:
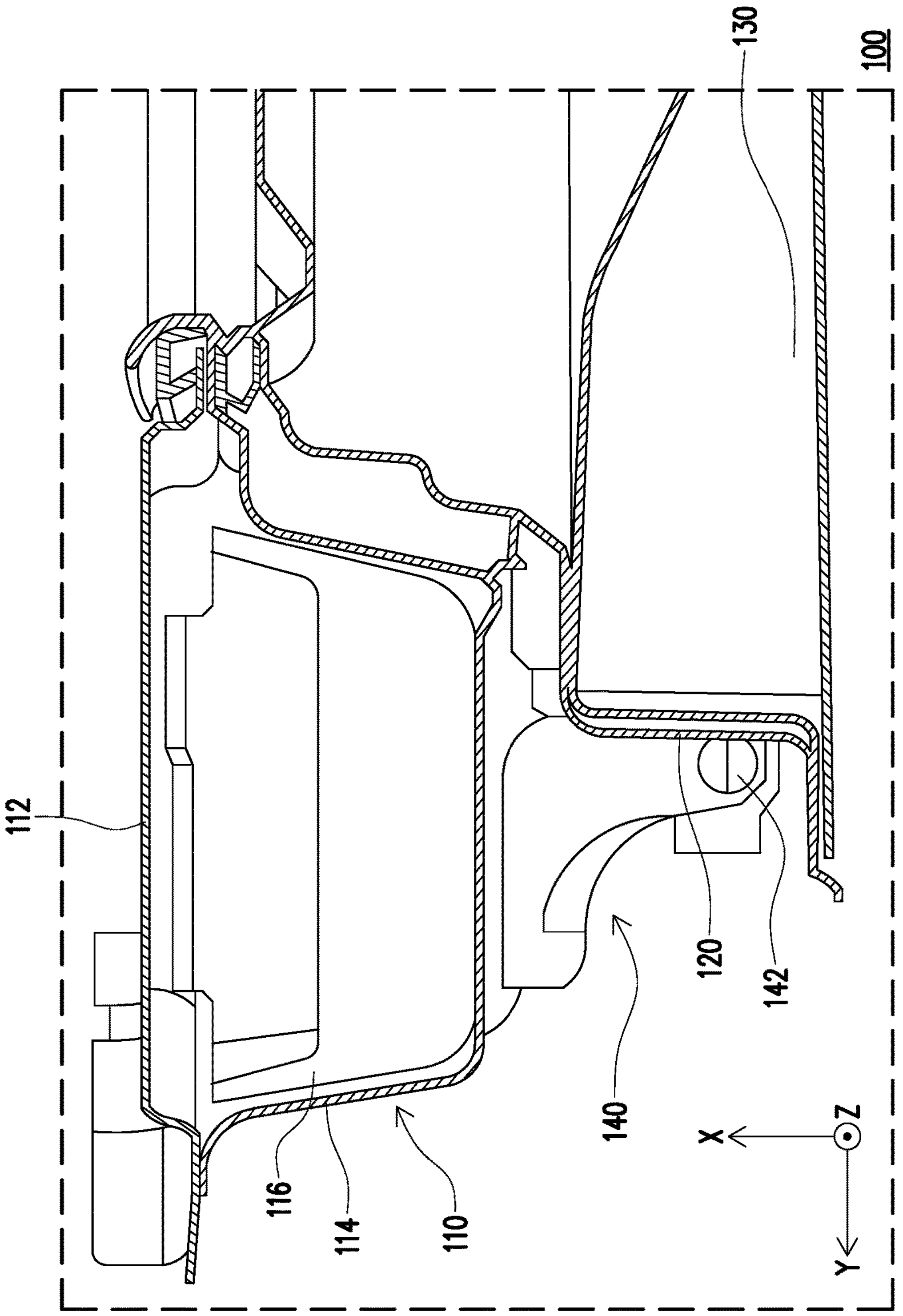
FIG. 2A is a top cross-sectional view along a section line A-A of the side structure of the vehicle of FIG. 1.
Figure 2B:
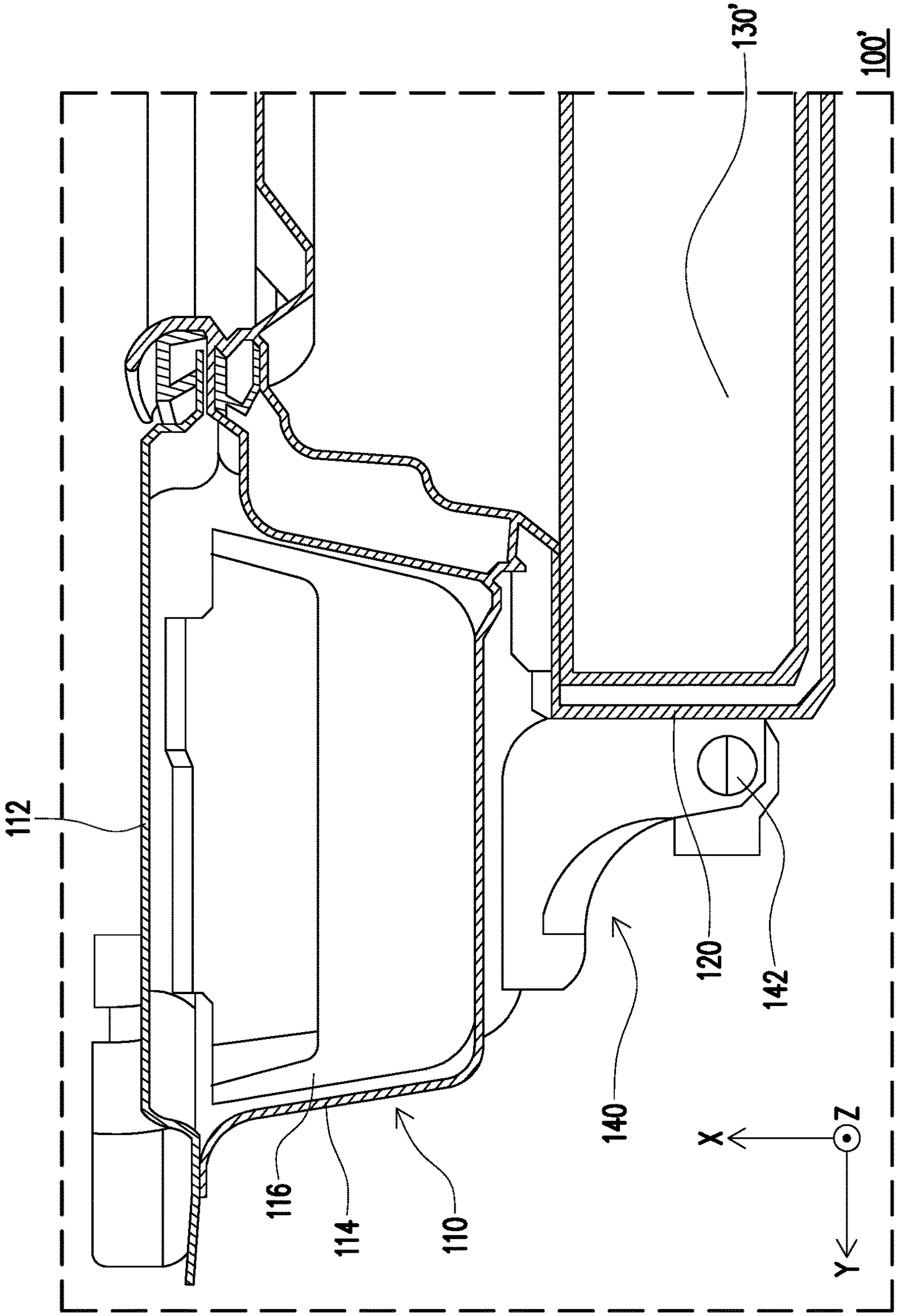
FIG. 2B is a top cross-sectional view of a side structure of a vehicle of a modified embodiment of FIG. 2A.
Figure 3:
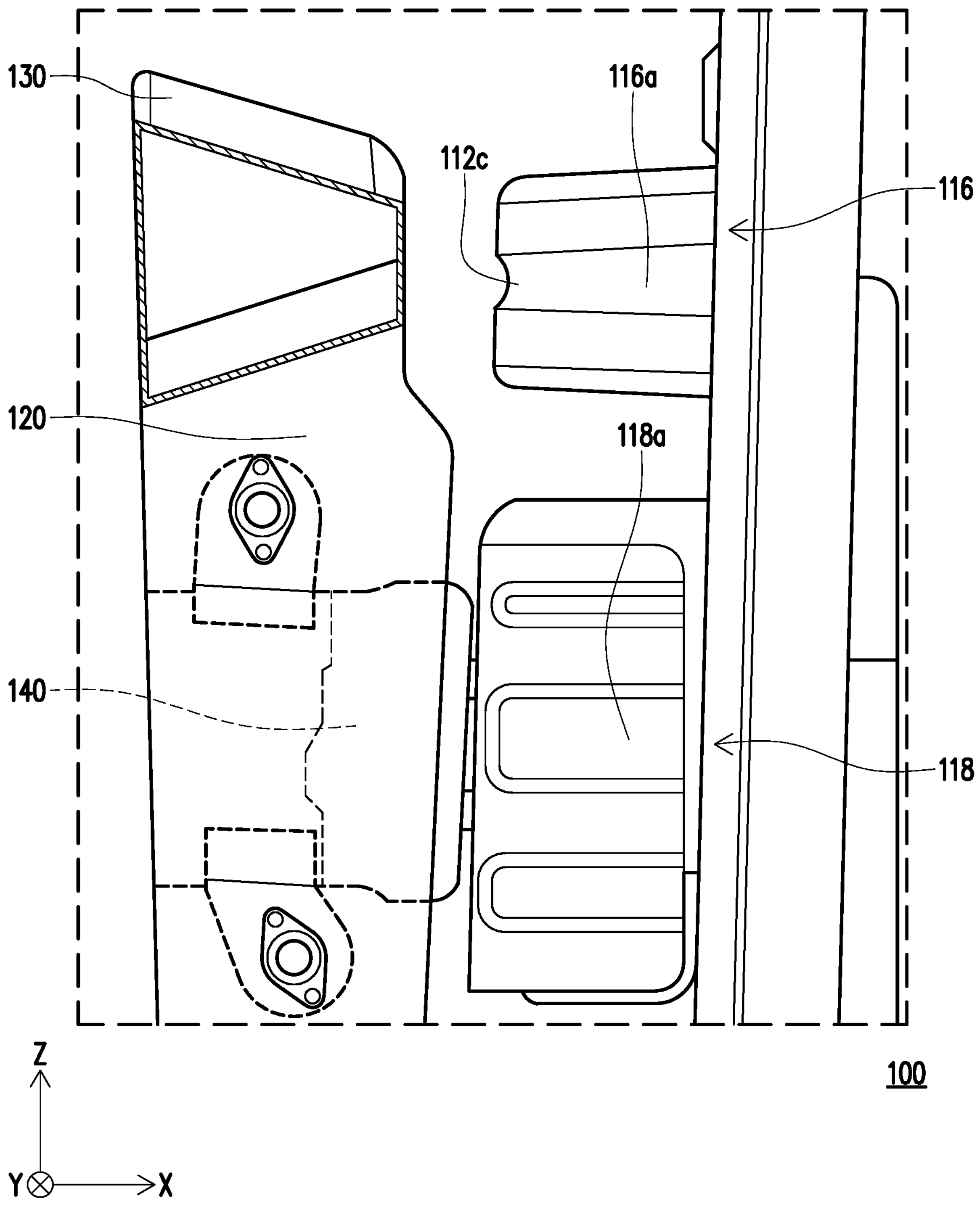
FIG. 3 is a partially enlarged schematic view of the hidden pillar outer member of the side structure of the vehicle of FIG. 1.
Figure 4:
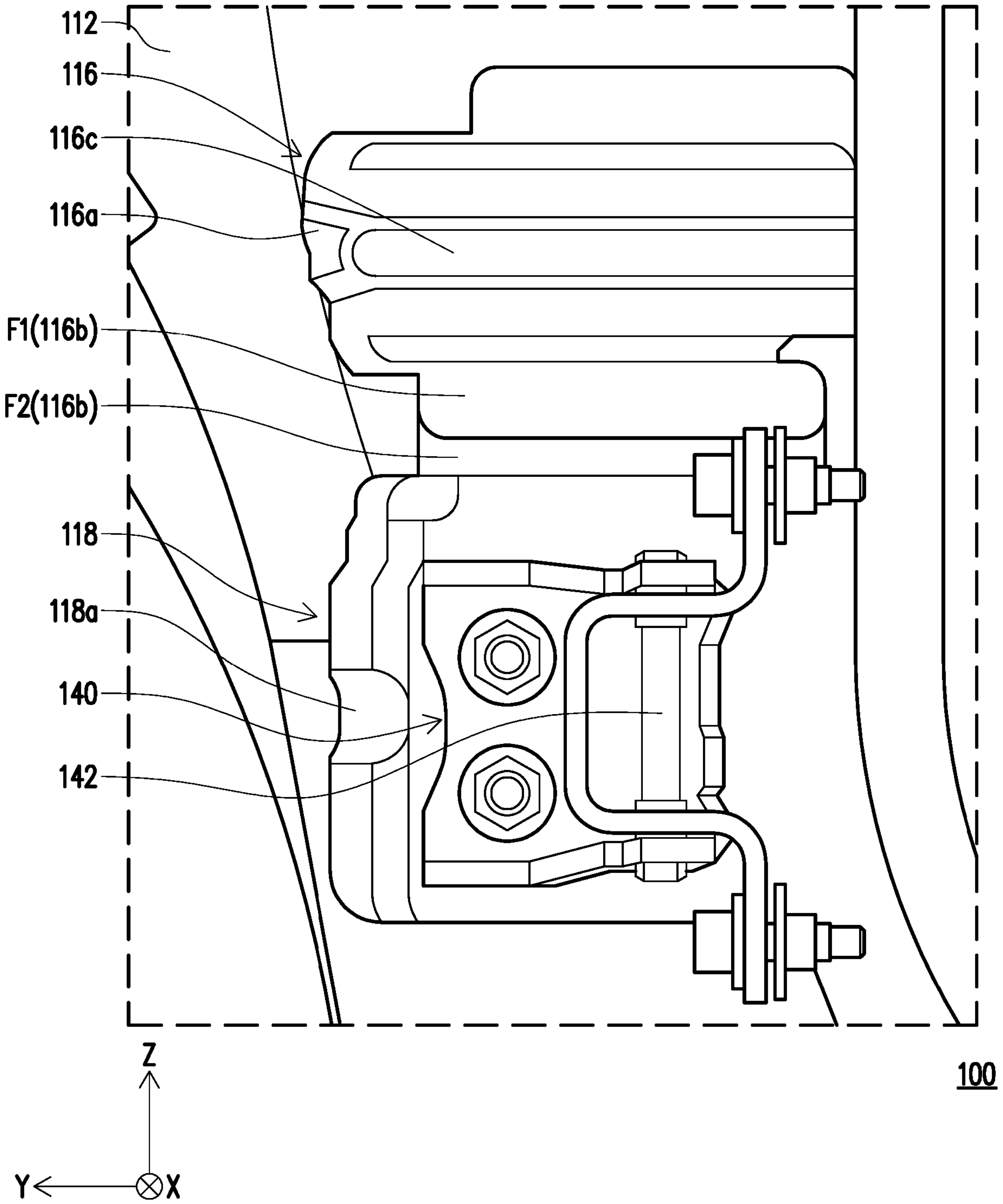
FIG. 4 is a rear cross-sectional view along a section line B-B of the side structure of the vehicle of FIG. 1.
Figure 5:
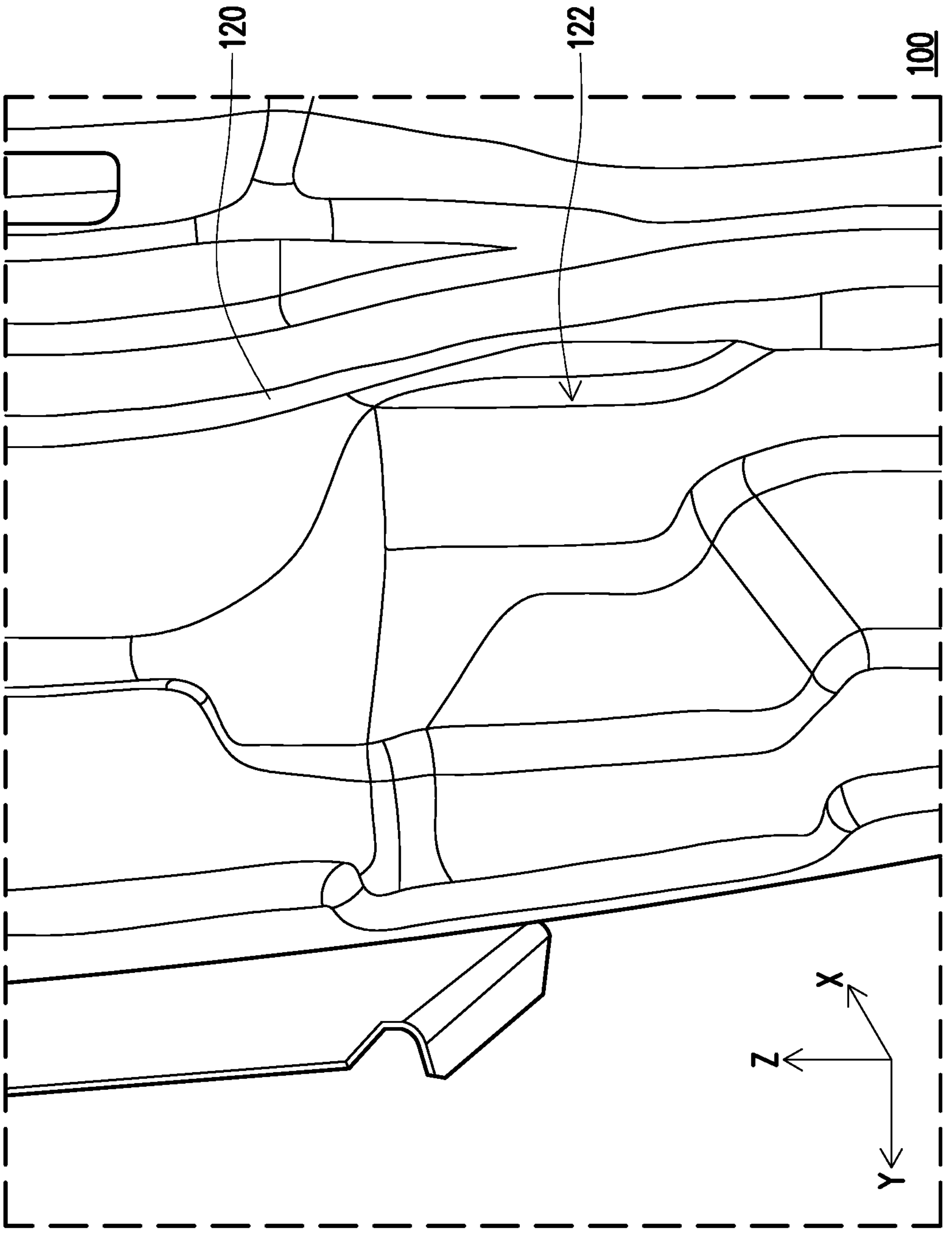
FIG. 5 is a partial perspective view of the door panel of the side structure of the vehicle of the embodiment.

FIG. 1 is a partial side view of a side structure of a vehicle according to an embodiment of the disclosure. FIG. 2A is a top cross-sectional view along a section line A-A of the side structure of the vehicle of FIG. 1. FIG. 2B is a top cross-sectional view of a side structure of a vehicle of a modified embodiment of FIG. 2A. FIG. 3 is a partially enlarged schematic view of the hidden pillar outer member of the side structure of the vehicle of FIG. 1. FIG. 4 is a rear cross-sectional view along a section line B-B of the side structure of the vehicle of FIG. 1. FIG. 5 is a partial perspective view of the door panel of the side structure of the vehicle of the embodiment. In the embodiment, a side structure of a vehicle 100 is, for example, a side structure applied to an ordinary passenger car (not shown), but the disclosure is not limited thereto. The side structure of the vehicle 100 may also be applied to other similar structures. In addition, since the left and right sides of the vehicle body have a substantially symmetrical structure, for convenience of description, the following description will be based on one side of the vehicle. A vehicle width direction X, a vehicle front-rear direction Y, and a vehicle up-down direction Z in the drawings are not intended to limit the positional relationship of each component in the disclosure. In addition, it should be noted that unless otherwise specified, the inner side, front and above used in the following description are the directions pointed by arrows of the vehicle width direction X, the vehicle front-rear direction Y and the vehicle up-down direction Z, and the outer side, rear and below used in the description are the opposite directions of the aforementioned. Wherever possible, the same reference numerals are used in the accompanying drawings and descriptions to refer to the same or similar parts. The side structure of the vehicle 100 of the embodiment will be described below with reference to FIGS. 1 to 5.

Referring to FIGS. 1 to 3, in the embodiment, the side structure of the vehicle 100 includes a pillar 110, a door panel 120 and a door beam 130. The pillar 110 extends along the vehicle up-down direction Z and is formed into a hollow structure. Specifically, the pillar 110 includes a pillar inner member 112 and a pillar outer member 114. The pillar inner member 112 is formed in a hat shape with an opening facing an outer side in the vehicle width direction X. The pillar outer member 114 is formed in a hat shape with an opening facing an inner side in the vehicle width direction X. The pillar inner member 112 and the pillar outer member 114 are joined in the vehicle width direction X to form a hollow structure. The door panel 120 is disposed at a door opening DO of the vehicle, that is, behind the pillar 110 in the vehicle front-rear direction Y. The door beam 130 is disposed in the door panel 120 and extends along the vehicle front-rear direction Y, and is formed into a hollow structure. The cross-sectional shape of the door beam 130 is, for example, a trapezoid with a wider outer side and a narrower inner side (as shown in FIG. 3), but may also be other suitable shapes.

Particularly, in the embodiment, the pillar 110 overlaps the door beam 130 when viewed from the vehicle width direction X (that is, the viewing perspective of FIG. 1). Specifically, the door beam 130 is disposed at a position further outside than the pillar 110 in the vehicle width direction X. Moreover, the pillar 110 and an end portion of the door beam 130 are disposed correspondingly in the vehicle width direction X (refer to FIG. 2A). Furthermore, the pillar 110 includes a first bulkhead 116. The first bulkhead 116 is formed in a box shape, for example, but in other embodiments not shown, the first bulkhead 116 may also be a closed surface formed in a sheet shape or other structures. The first bulkhead 116 is disposed inside the hollow structure of the pillar 110 and corresponds to a position where the pillar 110 overlaps the door beam 130 when viewed from the vehicle width direction X. That is, the first bulkhead 116 and the door beam 130 are disposed correspondingly in the vehicle width direction X. Furthermore, the first bulkhead 116 separate a space inside the pillar 110 in the vehicle up-down direction Z.

It can be seen from this that in the side structure of the vehicle 100 of the embodiment, the door beam 130 overlaps the pillar 110 in the vehicle width direction, so that in the event of a side impact, the load can be transmitted from the door beam 130 to the higher rigidity place of the pillar 110. In addition, a first bulkhead 116 is provided inside the pillar 110 at a position where the pillar overlaps the door beam 130, which can further suppress the cross section from being crushed when the pillar 110 is stressed. Accordingly, the side structure of the vehicle 100 of the embodiment can withstand impacts from the front-rear direction and the side direction with a relatively simple structure.

In addition, the pillar 110 in the embodiment is, for example, a front pillar FP disposed in the front of the vehicle front-rear direction Y. However, in other embodiments, the pillar 110 may also be a central pillar or a rear pillar in the vehicle, and is not limited to the front pillar. Furthermore, the front pillar FP is formed as a part of a wheelhouse WH in the rear of the vehicle front-rear direction Y. Therefore, when a front side impact occurs, the load pushed from the front to the rear can utilize the structure of the front pillar FP, that is, the pillar 110, the door beam 130 overlapping the pillar 110, the first bulkhead 116 in the pillar 110 and other structures to suppress section crushing and provide higher rigidity support.

Furthermore, in the embodiment, a door hinge 140 is formed on an outer side surface of the pillar 110 in the vehicle width direction X. The door hinge 140 is connected to the door panel 120 in the vehicle front-rear direction Y, for example, by bolt locking, but the disclosure is not limited thereto. Furthermore, the door hinge 140 and the end portion of the door beam 130 are disposed to be staggered in the vehicle up-down direction Z. Specifically, the door hinge 140 is disposed further below than the end portion of the door beam 130 in the vehicle up-down direction Z. In this way, the door beam 130 can extend to a further forward position in the vehicle front-rear direction Y without being blocked by the door hinge 140. Furthermore, when viewed from the vehicle width direction, the overlapping area of the door beam 130 and the pillar 110 is larger, which facilitates the improvement of the rigidity in response to a side impact.

In addition, a patch P joined to the door panel 120 is formed on the front side of the door opening DO in the vehicle front-rear direction Y. The patch P is disposed at a position corresponding to the door hinge 140 and extends generally along the vehicle up-down direction Z. Furthermore, the patch P is respectively joined to the door beam 130 and the door hinge 140. That is, the patch P is joined and fixed to three components including the door panel 120, the door beam 130 and the door hinge 140 respectively. In this way, the rigidity of the joint can be increased to support where the load is input. For example, in the event of a side impact, the load of the door beam 130 may be transmitted to the door hinge 140 with higher rigidity through the patch P. When a front side impact occurs, the load introduced by the pillar 110 is transmitted from the door hinge 140 through the door panel 120 and the patch P to the door beam 130. The joining method is, for example, fixed by welding on the inner side of the vehicle, but in other embodiments not shown, the joining method may also be fixed by bolt locking, and is not limited by the disclosure.

Referring to FIG. 2A, furthermore, the door hinge 140 includes a rotating portion 142. When viewed from the vehicle up-down direction Z (that is, the perspective of FIG. 2A), the door hinge 140 partially overlaps the door beam 130 (the front end of the door beam 130 and the rear end of the door hinge 140). The door beam 130 is joined to the door panel 120 at a position further rearward than the rotating portion 142 in the vehicle front-rear direction Y. In this way, under the premise that the pillar 110 and the door beam 130 do not interfere when the door (not shown) is opened and closed, the pillar 110 and the door beam 130 are brought as close as possible to increase the overlapping area of the two in the vehicle width direction X.

Alternatively, referring to FIG. 2B, in a modified example, the position of a door beam 130' of a side structure of a vehicle 100' is different from the position of the door beam 130 of the side structure of the vehicle 100. When viewed from the vehicle width direction X (that is, the perspective of FIG. 2B), the door hinge 140 overlaps the first bulkhead 116. Furthermore, the door hinge 140 and an end portion of the door beam 130' are disposed correspondingly in the vehicle front-rear direction Y. That is, the door hinge 140, the first bulkhead 116 and the end portion of the door beam 130' are set to the same height in the vehicle up-down direction Z. In this way, when a side impact occurs, the load borne by the door beam 130' may be directly transmitted to the pillar 110 and the door hinge 140 to improve the overall rigidity.

Referring to FIGS. 3 and 4, in the embodiment, the pillar 110 further includes a second bulkhead 118. The second bulkhead 118 is formed in a box shape and is connected to the door hinge 140. That is, the second bulkhead 118 is disposed further below than the first bulkhead 116 in the vehicle up-down direction Z. As shown in FIG. 4, the first bulkhead 116 and the second bulkhead 118 each have a flange portion 116*a* and a flange portion 118*a* extending along the vehicle up-down direction Z. The flange portion 116*a* includes a lower flange F1 extending downward from the lower side of the first bulkhead 116 in the vehicle up-down direction Z. The flange portion 118*a* includes an upper flange F2 extending upward from the upper side of the second bulkhead 118 in the vehicle up-down direction Z. The lower flange F1 of the first bulkhead 116 is joined to the upper flange F2 of the second bulkhead 118 in an overlapping manner in the vehicle width direction X to further improve the rigidity of the first bulkhead 116 and the second bulkhead 118.

Furthermore, a first bead 116*b* and a first bead 118*b* extending along the vehicle width direction X are formed on front-rear side surfaces of the first bulkhead 116 and the second bulkhead 118 in the vehicle front-rear direction Y, respectively. The first bead 116*b* of the first bulkhead 116 is formed at a position corresponding to the door beam 130, and the first bead 118*b* of the second bulkhead 118 is formed at a position corresponding to the door hinge 140. In other words, the door beam 130 is disposed in an extending direction of the first bead 116*b*, and the door hinge 140 is disposed in an extending direction of the first bead 118*b*, thereby enhancing the rigidity in response to a side impact. In addition, as shown in FIG. 4, the first bulkhead 116 is further formed with a second bead 116*c* extending along the vehicle front-rear direction Y on the outer side surface in the vehicle width direction X, thereby enhancing the rigidity in response to a front-side impact.

Referring to FIG. 5, in the embodiment, the door panel 120 includes a concave portion 122. The concave portion 122 is formed in a trapezoid shape corresponding to the cross-sectional shape of the door beam 130, which is wider on the outside and narrower on the inside, and is recessed along the longitudinal direction of the door beam 130 (the vehicle front-rear direction Y). Furthermore, the concave portion 122 is joined to the end portion of the door beam 130. In this way, the space in front of the door panel 120 in the vehicle front-rear direction Y can be increased, thereby increasing the overlapping area of the door beam 130 and the pillar 110 in the vehicle width direction X.

Referring to FIG. 1 again, in the embodiment, the pillar 110 is formed with an upper side frame 150 extending along the vehicle front-rear direction Y on the front side of the vehicle front-rear direction Y. The pillar inner member 112 includes an inclined portion 112*a* which extends obliquely toward the upper side frame 150. Specifically, the inclined portion 112*a* extends obliquely upward in the vehicle up-down direction Z and forward in the vehicle front-rear direction Y, and is formed in a triangular shape that protrudes further forward than the pillar outer member 114. Furthermore, the inclined portion 112*a* is joined to the upper side frame 150. When a front-side impact occurs, the load can be transmitted from the upper side frame 150 to the inclined portion 112*a* and the pillar 110 in sequence.

To sum up, in the side structure of the vehicle of the disclosure, the door beam overlaps the pillar in the vehicle width direction, so that in the event of a side impact, the load can be transmitted from the door beam to the higher rigidity place of the pillar. In addition, the first bulkhead is provided inside the pillar and corresponds to a position where the pillar overlaps the door beam, which can further suppress the cross section from being crushed when the pillar is stressed. Moreover, the front side of the door opening is formed with the patch that is joined to the door panel, the door beam and the door hinge, thereby improving the rigidity of the joint and supporting where the load is input. Accordingly, the side structure of the vehicle of the disclosure can withstand impacts from the front-rear direction and the side direction with a relatively simple structure.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A side structure of a vehicle, comprising:

a pillar, extending along a vehicle up-down direction and formed into a hollow structure;

a door panel, disposed at a door opening of the vehicle; and a door beam, disposed in the door panel, extending along a vehicle front-rear direction and formed into a hollow structure, wherein the pillar overlaps the door beam when viewed from a vehicle width direction, the pillar comprises a first bulkhead which is disposed inside the pillar and corresponds to a position where the pillar overlaps the door beam when viewed from the vehicle width direction, and the first bulkhead separates a space inside the pillar in the vehicle up-down direction, wherein a door hinge is formed on an outer side surface of the pillar in the vehicle width direction and is connected to the door panel, the door hinge and an end portion of the door beam are disposed to be staggered in the vehicle up-down direction, the pillar further comprises a second bulkhead which is formed in a box shape and is connected to the door hinge, the first bulkhead and the second bulkhead each have a flange portion extending along the vehicle up-down direction, and a lower flange of the first bulkhead is joined to an upper flange of the second bulkhead in an overlapping manner.

2. The side structure of the vehicle according to claim 1, wherein a patch joined to the door panel is formed on a front side of the door opening in the vehicle front-rear direction, and the patch is respectively joined to the door beam and the door hinge.

3. The side structure of the vehicle according to claim 2, wherein the door hinge comprises a rotating portion, the door hinge partially overlaps the door beam when viewed from the vehicle up-down direction, and the door beam is joined to the door panel at a position further rearward than the rotating portion in the vehicle front-rear direction.

4. The side structure of the vehicle according to claim 1, wherein the first bulkhead and the second bulkhead are each formed with a first bead extending along the vehicle width direction on a front-rear side surface in the vehicle front-rear direction, and the first bead of the first bulkhead is formed at a position corresponding to the door beam, and the first bead of the second bulkhead is formed at a position corresponding to the door hinge.

5. The side structure of the vehicle according to claim 1, wherein a second bead extending along the vehicle front-rear direction is formed on an outer side surface of the first bulkhead in the vehicle width direction.

6. The side structure of the vehicle according to claim 1, wherein the door panel comprises a concave portion which is recessed along a longitudinal direction of the door beam, and the concave portion is joined to an end portion of the door beam.

7. The side structure of the vehicle according to claim 1, wherein the pillar comprises a pillar inner member and a pillar outer member, the pillar is formed with an upper side frame extending along the vehicle front-rear direction on a front side of the vehicle front-rear direction, the pillar inner member comprises an inclined portion extending obliquely toward the upper side frame, and being joined to the upper side frame, and the inclined portion is formed at a position corresponding to the door beam in the vehicle front-rear direction.

8. The side structure of the vehicle according to claim 1, wherein the pillar is a front pillar of the vehicle, and the front pillar is formed as a part of a wheelhouse.

9. The side structure of the vehicle according to claim 1, wherein a door hinge is formed on an outer side surface of the pillar in the vehicle width direction and is connected to the door panel, the door hinge overlaps the first bulkhead when viewed from the vehicle width direction, and the door hinge and an end portion of the door beam are disposed correspondingly in the vehicle front-rear direction.

10. A side structure of a vehicle, comprising:

a pillar, extending along a vehicle up-down direction and formed into a hollow structure;

a door panel, disposed at a door opening of the vehicle; and a door beam, disposed in the door panel, extending along a vehicle front-rear direction and formed into a hollow structure, wherein the pillar overlaps the door beam when viewed from a vehicle width direction, the pillar comprises a first bulkhead which is disposed inside the pillar and corresponds to a position where the pillar overlaps the door beam when viewed from the vehicle width direction, and the first bulkhead separates a space inside the pillar in the vehicle up-down direction, wherein the pillar comprises a pillar inner member and a pillar outer member, the pillar is formed with an upper side frame extending along the vehicle front-rear direction on a front side of the vehicle front-rear direction, the pillar inner member comprises an inclined portion extending obliquely toward the upper side frame, and being joined to the upper side frame, and the inclined portion is formed at a position corresponding to the door beam in the vehicle front-rear direction.

* * * * *